W. C. & S. POLLOCK.
IGNITION DEVICE FOR EXPLOSIVE ENGINE VAPORIZING CHAMBERS.
APPLICATION FILED APR. 8, 1912.
1,165,020.
Patented Dec. 21, 1915.
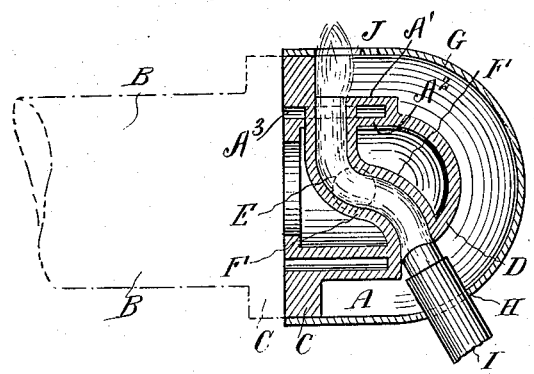
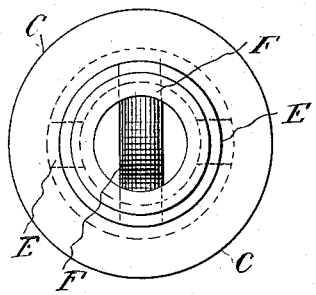
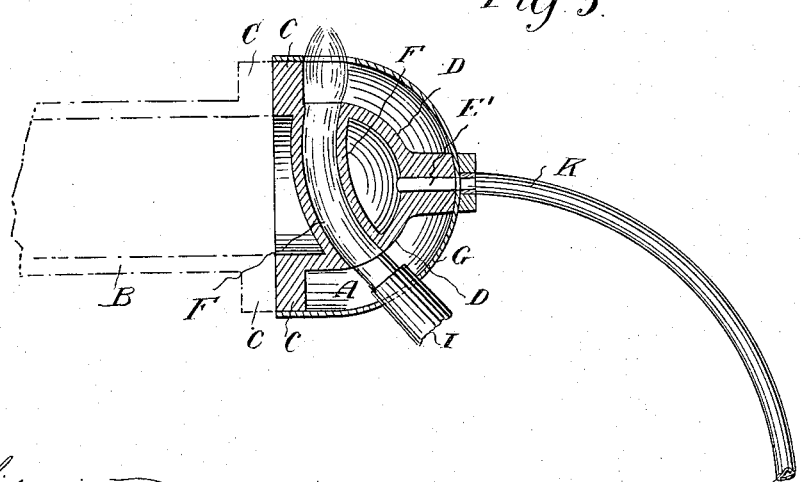

UNITED STATES PATENT OFFICE.

WILLIAM CRAIG POLLOCK AND STEWART POLLOCK, OF GLASGOW, SCOTLAND.

IGNITION DEVICE FOR EXPLOSIVE-ENGINE VAPORIZING-CHAMBERS.

1,165,020.  Specification of Letters Patent.   Patented Dec. 21, 1915.

Application filed April 8, 1912. Serial No. 689,237.

*To all whom it may concern:*

Be it known that we, WILLIAM CRAIG POLLOCK and STEWART POLLOCK, both of 34 Robertson street, Glasgow, Scotland, have invented certain new and useful Improvements in Ignition Devices for Explosive-Engine Vaporizing-Chambers, of which the following is a specification.

This invention which relates to internal combustion engines has special reference to the vaporizer of such engines which is designed for the use of crude oil, although equally applicable to engines using other kinds of oil more or less volatile, and consists in providing a tortuous or bent tube which extends transversely through the end of the cylinder in close proximity to the charge inlet. The cylinder terminates with a short cylindrical extension which is provided with a flange bolted or otherwise fitted to the cylinder of the oil engine. This extension has a dome, and the tube passes through said dome with a passage or duct open to the atmosphere passing through it. The flame from a blow lamp is projected through the passage of the tube and this heats the tube on its exterior surface to the degree of redness necessary to vaporize the oil, ignite, and explode the charge.

In order that our invention may be properly understood and readily carried into effect, we have hereunto appended one sheet of drawings, of which—

Figure 1 is a longitudinal section of a vaporizer fitted to a cylinder shown in dotted lines applicable to a four cycle engine. Fig. 2 is an end view of the same with the cylinder of engine removed. Fig. 3 is a view corresponding to Fig. 1 of a vaporizer fitted to a cylinder applicable to a two cycle engine.

A is the flange-extension fitted to the cylinder B of the oil engine by means of the flange C. The flange-extension A consists of a short length of cylinder $A^1$ which is provided with a concentric inner jacket lining $A^2$ forming a jacketed space $A^3$. The interior of the cylinder $A^1$ and the interior of the dome D are in open communication with the cylinder B. The oil inlet is represented by the dotted line E.

F is a tube which is carried in a tortuous or bent manner transversely through the short length of cylinder $A^1$ and the lower portion of the dome D, in order to present a considerable amount of heating surface required to vaporize the charge which it does instantaneously and ignites the gas created by vaporization and also prevents the tube from shrinking and cracking.

G is a cover made to surround the said extension and provided with an opening or orifice H made therein for the insertion of the nozzle I of the blow lamp, while the products of combustion pass through the discharge outlet J.

Referring to Fig. 3, the extension A there shown consists simply of a dome D and the tube F is of the curved formation there shown. The oil is admitted through the pipe K into the inlet $E^1$ at the extremity of the said dome D.

We claim—

An internal combustion engine cylinder having a vaporizing chamber, and a tube formed integral with the wall of said chamber at both ends and extending into the chamber, said tube being tortuous with respect to the direction of its length and between the points of juncture of its ends with said chamber, the wall of said tube intermediate the ends of the tube being free from the walls of said chamber whereby expansion and contraction of the tube may take place independently of expansion and contraction of the chamber.

In testimony whereof we affix our signatures in presence of two witnesses.

WILLIAM CRAIG POLLOCK.
STEWART POLLOCK.

Witnesses:
GEORGE DARLINGTON,
GEORGE POLLOCK.

Copies of this patent may be obtained for five cents each, by addressing the "Commissioner of Patents, Washington, D. C."